May 27, 1941.   K. L. HERRMANN   2,243,817
INTERNAL COMBUSTION ENGINE
Filed May 14, 1937   6 Sheets-Sheet 3
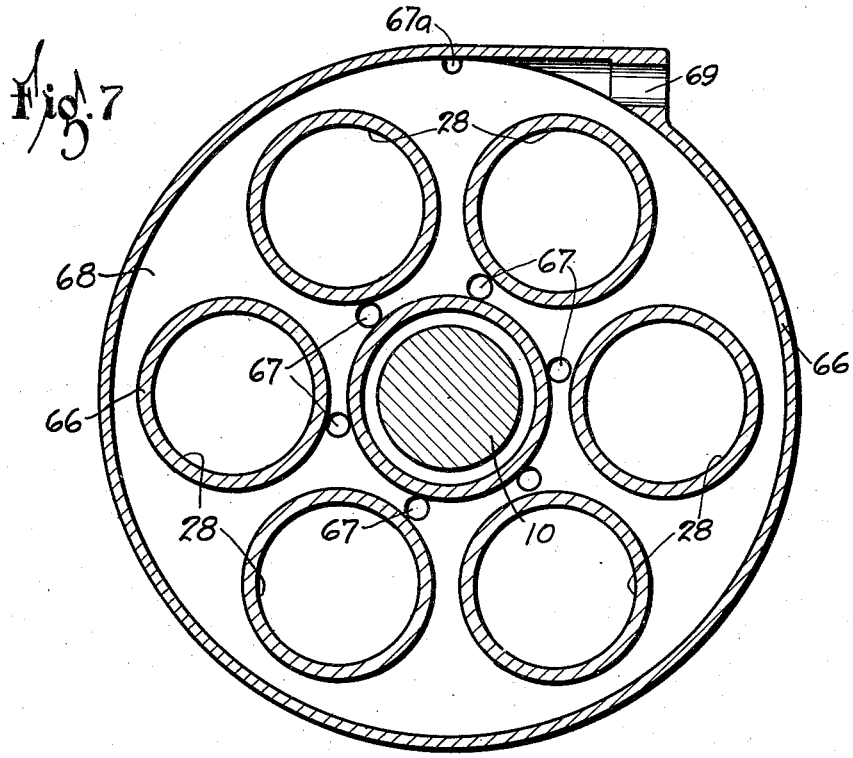
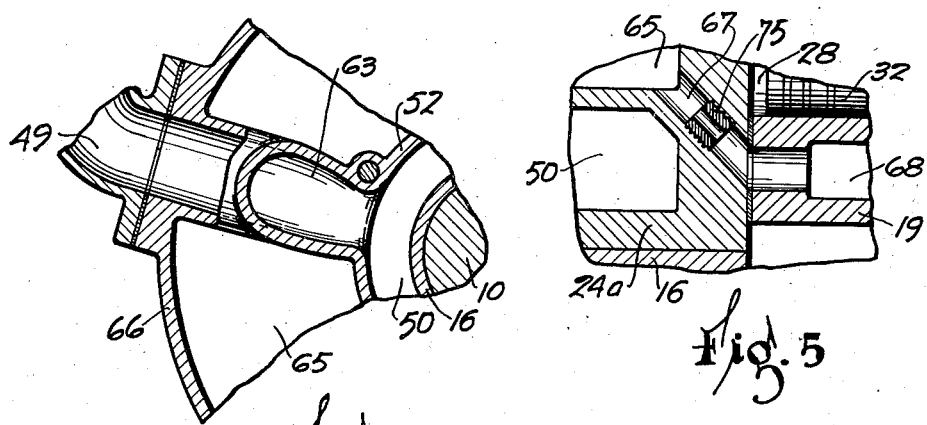
INVENTOR.
KARL L. HERRMANN
BY
ATTORNEY

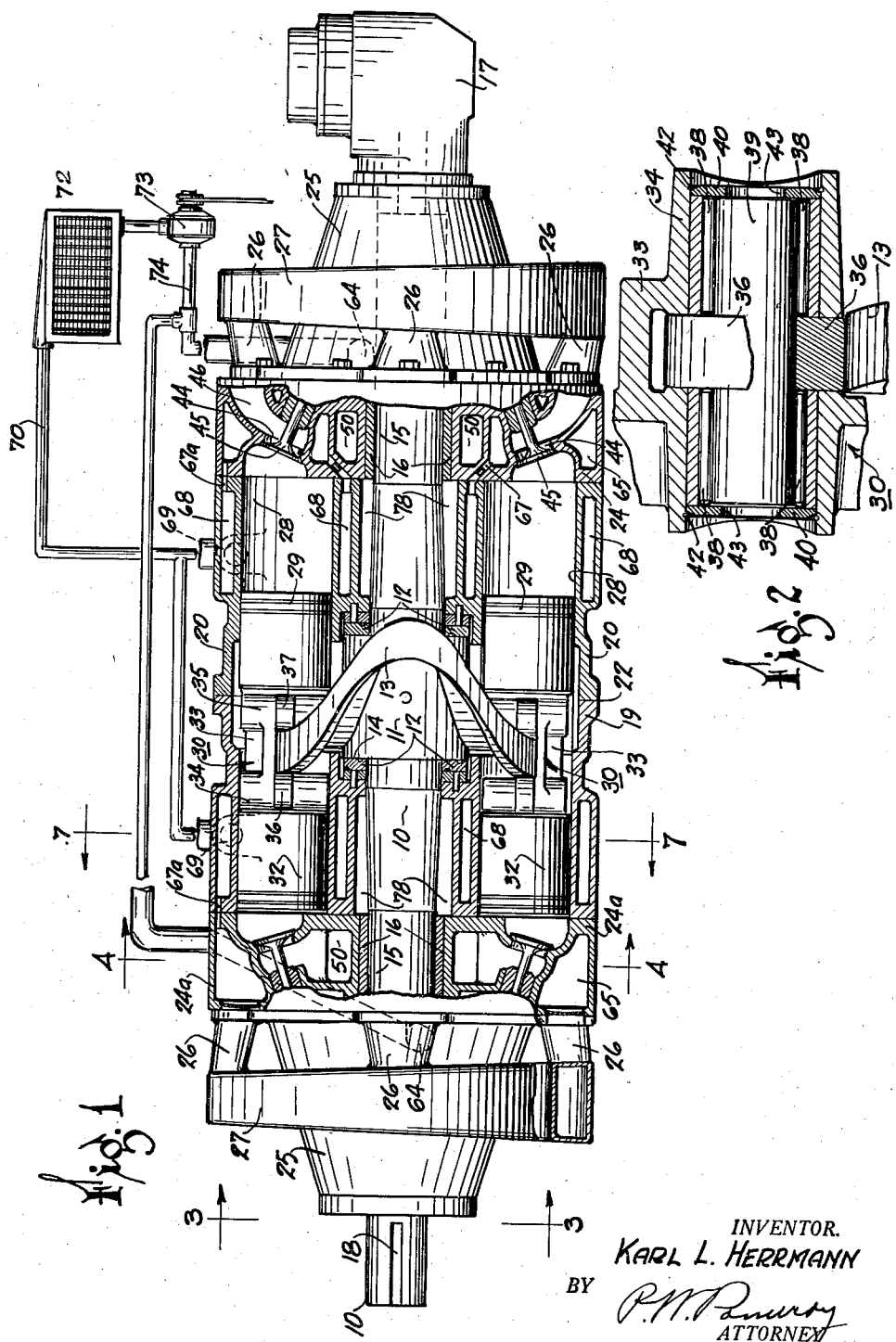

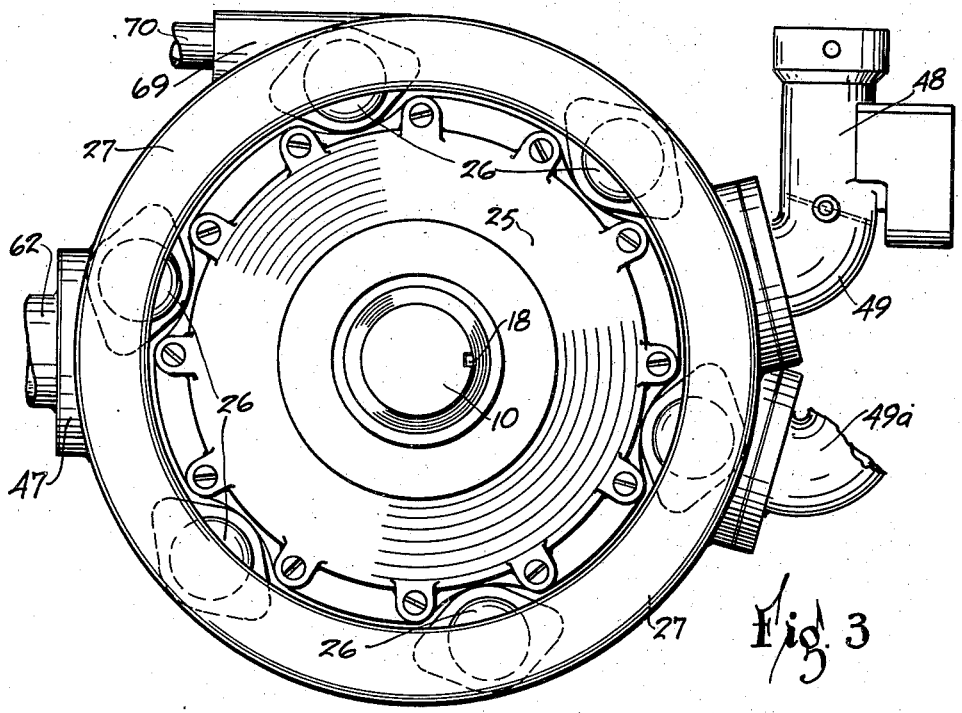
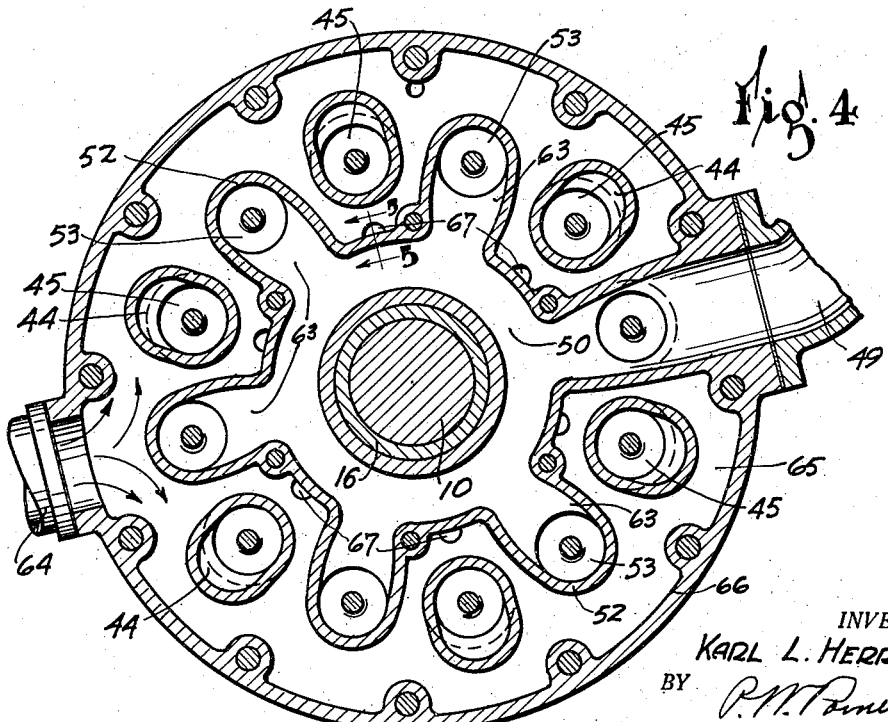

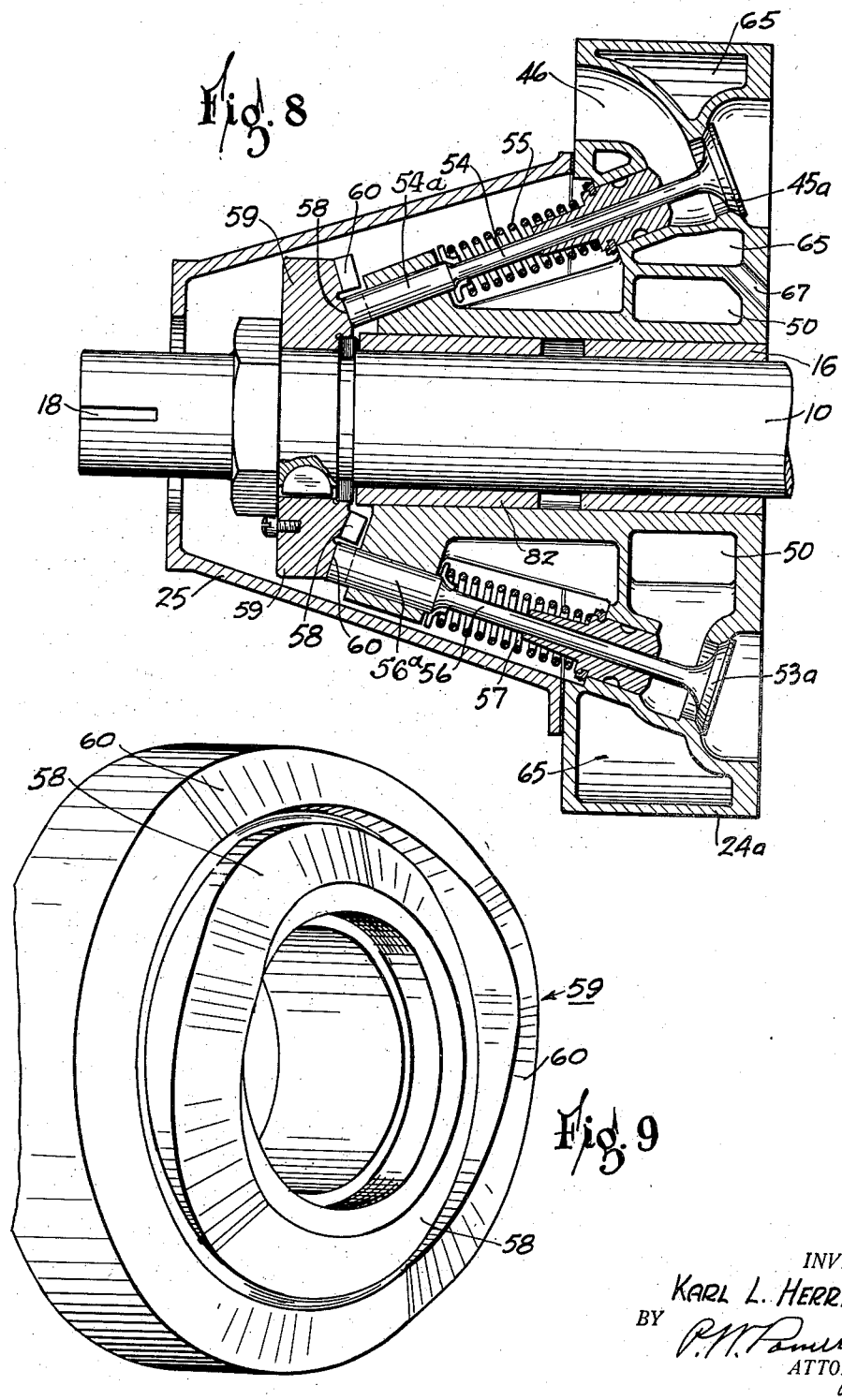

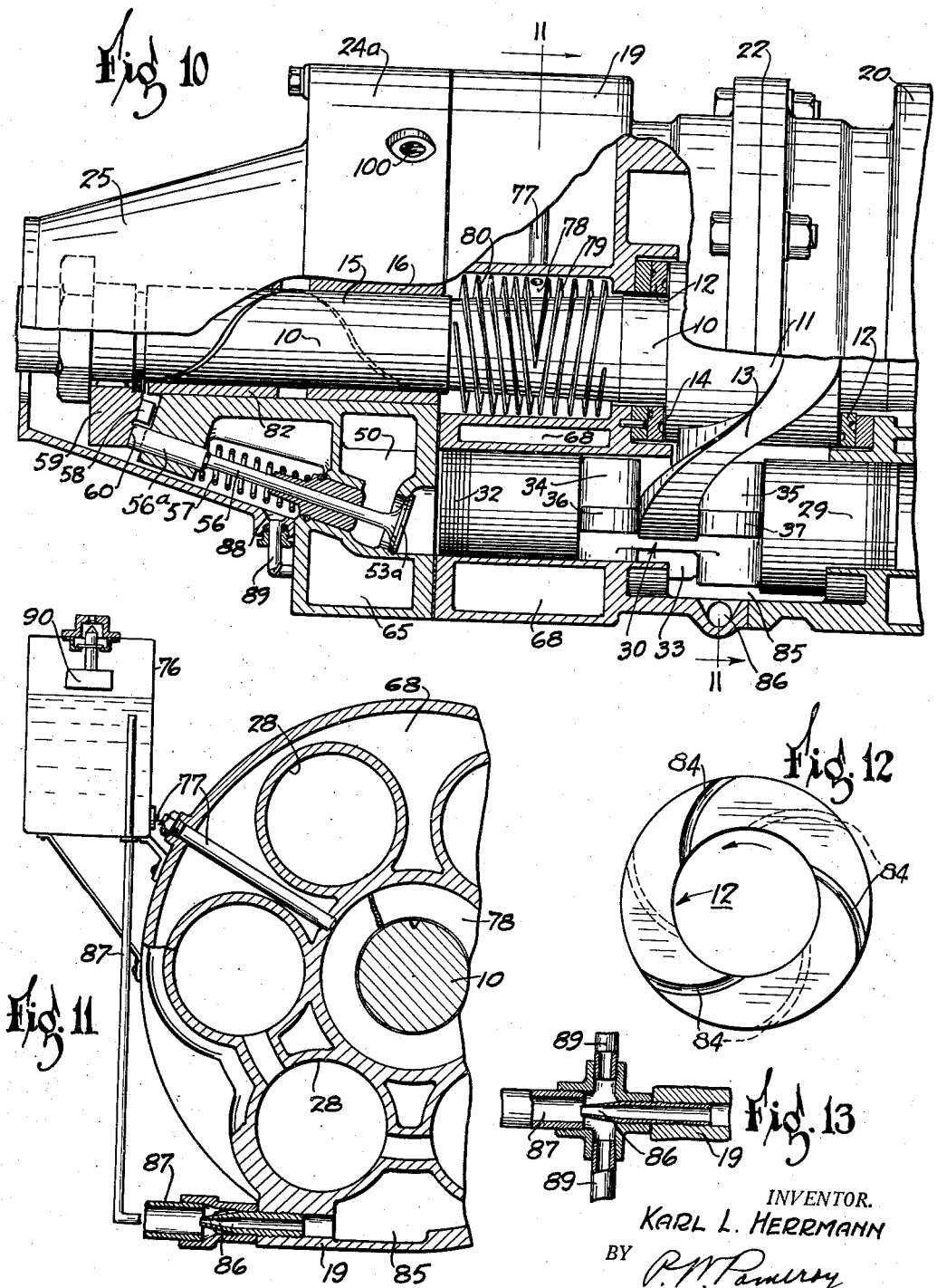

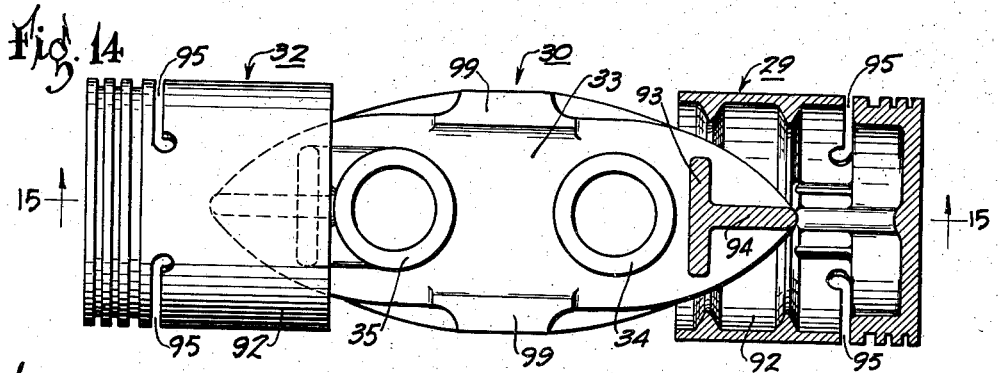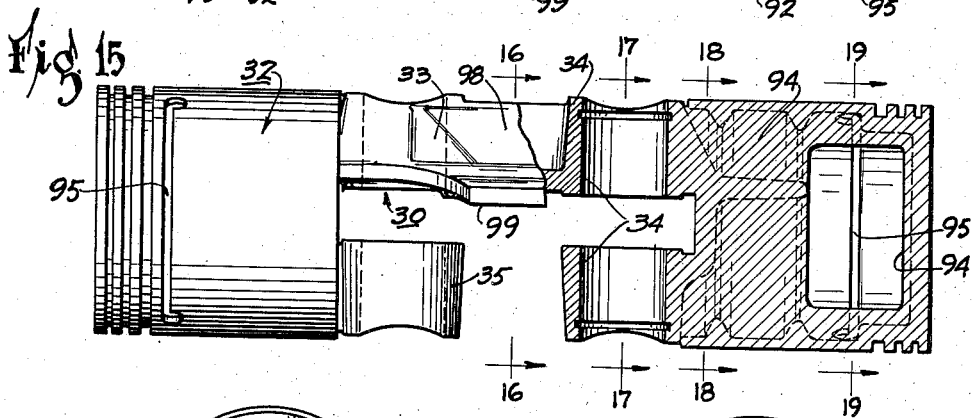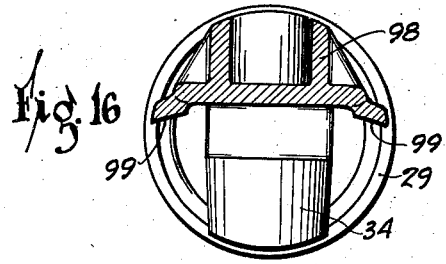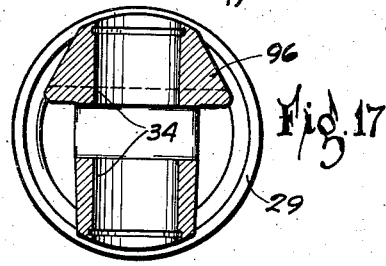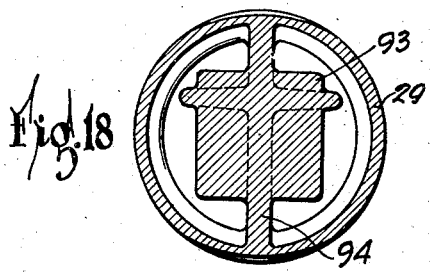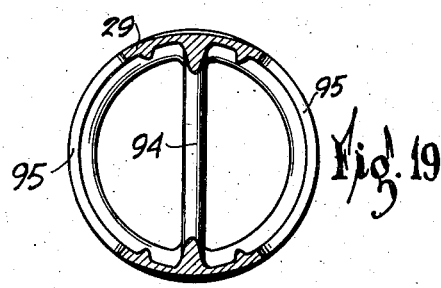

Patented May 27, 1941

2,243,817

UNITED STATES PATENT OFFICE 2,243,817

INTERNAL COMBUSTION ENGINE

Karl L. Herrmann, South Bend, Ind.

Application May 14, 1937, Serial No. 142,653

7 Claims. (Cl. 123—58)

This invention relates to internal-combustion engines, and particularly to internal-combustion engines of the barrel type.

Such engines have their cylinders parallel to the center axis of the engine, and my invention may be used with such engines employing either a four-stroke cycle, a two-stroke cycle or a Diesel system. It is adaptable to engines for use in motor vehicles or in airplanes and for use as marine, railway and stationary engines.

One object of this invention is to provide a barrel-type internal-combustion engine which runs without vibration and which is smooth and quiet in operation, compact in size, light in weight, and more economical in the use of fuel, lubricant and in cost of manufacture and maintenance than the conventional types now in use.

Another object is to provide valve operating mechanism simplified in structure, and having few parts and long life.

A further object is to provide means comprising an annular intake manifold in the cylinder head or block for better distribution of fuel.

A further feature is the provision of a set of intake valves and a set of exhaust valves, all arranged with their centers equidistant from the center of the drive shaft, one set being actuated by one annular cam and the other set being actuated by a concentric annular cam.

Further objects and features and the details of construction will be apparent from the drawings and the detailed description to follow. In the accompanying drawings, there is illustrated in Figs. 1 to 19, inclusive, one mechanical embodiment of my invention as applied to a four-stroke cycle engine. Both arrangements can be applied to the Diesel type of fuel injection engine. The drawings, however, are to be taken as illustrative only, and the scope of the invention is to be limited solely by the subjoined claims.

In the drawings:

Fig. 1 is a view showing parts in side elevation and other parts in vertical section and disclosing a barrel type of internal-combustion engine constructed according to my invention;

Fig. 2 is a fragmentary sectional view, showing on an enlarged scale the construction of the thrust bearing and of the cam follower, which are carried in the connecting section of one of the double-ended pistons;

Fig. 3 is a view, in end elevation, taken in the direction of the arrows 3—3 of Fig. 1 and showing the exhaust manifold cover, carburetor and water outlet on an enlarged scale;

Fig. 4 is a sectional view, taken on the line 4—4 of Fig. 1, looking in the direction of the arrows 4—4 of that figure and showing on an enlarged scale the intake and exhaust valve pockets and also the passages from the carburetor to the respective intake valves and the passages through which the cooling fluid travels around the exhaust valves to the cylinder block;

Fig. 5 is a fragmentary sectional view on an enlarged scale, taken substantially on the line 5—5 of Fig. 4, showing a metering device which is located in one of the passages of the cooling system;

Fig. 6 is a fragmentary sectional view, taken on the line 4—4 of Fig. 1 but looking in the opposite direction of the arrows 4—4, showing a portion of the carburetor and the connecting passage for the intake manifold;

Fig. 7 is an enlarged sectional view, taken substantially on the line 7—7 of Fig. 1, showing the passages through which the cooling fluid travels within the cylinder block;

Fig. 8 is an enlarged sectional view, taken longitudinally through the cylinder head, having certain parts broken away and showing an intake valve, an exhaust valve and their related parts;

Fig. 9 is a perspective view of the valve operating cam, showing the cam surfaces for operating the intake and exhaust valves;

Fig. 10 is a fragmentary sectional view taken longitudinally of the engine and showing the supply and return of lubricant to and from the various moving parts of the engine;

Fig. 11 is a fragmentary cross-sectional view, taken substantially on the line 11—11 of Fig. 10, showing the method of supplying lubricant to the engine and also the arrangement for the return of lubricant to the reservoir;

Fig. 12 is a detailed view on an enlarged scale of one of the thrust bearings, showing the grooved surfaces for carrying and distributing the oil;

Fig. 13 is an enlarged fragmentary sectional view showing the venturi for returning oil to the reservoir;

Fig. 14 is a view, partly in plan and partly in section, showing one of the double-ended pistons, the portion in section showing one end of the piston and the method by which the piston skirt is tied to the connecting section;

Fig. 15 is a view, partly in elevation and partly in section, showing the double-ended piston of Fig. 14, the portion in section being taken substantially on the line 15—15 of Fig. 14;

Fig. 16 is a cross-sectional view taken substantially on the line 16—16 of Fig. 15;

Fig. 17 is a cross-sectional view, taken substantially on the line 17—17 of Fig. 15, showing the aperture for the cam follower shaft bearing;

Fig. 18 is a cross-sectional view taken substantially on the line 18—18 of Fig. 15 and showing the ribs at this section and the clearance between the piston skirt and the cylinder wall at the main rib;

Fig. 19 is a cross-sectional view taken substantially on the line 19—19 of Fig. 15 and showing the inside ribs at this section, the heat control slots and the clearance provided in the piston at the main rib for the expansion of the rib;

Referring to the drawings in which like numerals refer to like parts throughout the several views: there is shown an internal-combustion engine of the barrel type having twelve cylinders in two groups of six each. As shown in Fig. 1, the engine is composed of two similar halves. The drive shaft 10 extends through both halves of the engine. The cylinders are equally spaced in a circle around the drive shaft. The drive shaft has mounted on it, or integral with it, an enlarged portion approximately midway between the ends of the shaft, the enlarged portion being positioned between thrust bearings 12. Supported on and carried by the enlarged portion 11 is a T-section driving cam 13, through which the drive shaft is driven from the pistons. Perpendicular surfaces 14 at opposite ends of the enlarged portion 11 provide thrust surfaces for the bearings 12. The shaft 10 extends the entire length of the engine and is provided with journal surfaces 15 arranged to rotate in journals 16. One end of the drive shaft 10 is provided with an ignition distributor 17 and the other end is arranged as at 18 for connection to a coupling device. The cylinder block is formed in two sections 19 and 20, secured together as at 22. Adjacent the ends of the cylinder block sections 19 and 20 are cylinder heads 24 and 24a. The cylinder block sections are similar as are the cylinder heads, and the description of one in detail will serve to describe similar parts. On the head 24 there is secured a valve cover 25, and also thereon are six exhaust conduits, such as 26, all leading to the exhaust manifold 27. Each of the block halves is provided with six cylinder bores, such as 28, and each cylinder bore has associated with it one piston, such as 29, of a double-ended piston, designated generally as 30.

Referring still to Fig. 1, the double-ended piston 30 may be seen to comprise a pair of pistons 29 and 32 connected by a connecting portion 33. The connecting portion has formed therein a pair of journals 34 and 35 within which there are mounted roller bearings and cam followers, such as 36 and 37, the cam followers contacting with the cam 13 and transforming the energy of the pistons into torque for rotating the cam 13.

The structure of the roller bearings, their journals and cam followers may be seen more clearly in Fig. 2, where there is shown the journal 34 within which there is mounted on needle or roller bearings, such as 38, a shaft 39. This shaft 39 carries the cam follower 36, which, as stated above, contacts with the cam 13. The shaft 39 and roller bearings 38 are retained in position by washers 40 and snap rings 42. Apertures, such as 43, are provided in the washers 40 to permit lubricant to contact the rollers 38. Having roller bearings on both sides of the cam follower 36 gives ample roller bearing surface.

After explosion, the burnt gases are exhausted from the cylinders by the following means. As may be seen in Fig. 1, the cylinder 28 is provided with an exhaust opening 44, which is usually closed by an exhaust valve 45, the exhaust valve opening at times to allow the burnt gases to pass into the exhaust passage 46. From this exhaust passage 46, the gases pass through the exhaust conduit 26 to the exhaust manifold 27 and escape therefrom through the exhaust opening 47. The exhaust manifold 27, the exhaust outlet 47, and the several exhaust conduits 26 are shown more clearly in Fig. 3.

I also provide means for supplying fuel to the various cylinders. As may be seen in Fig. 3, I have provided a carburetor 48, which is connected by an intake conduit 49 (Figs. 3 and 4). This intake conduit 49 leads to an intake manifold 50 formed adjacent to the drive shaft and provided with a casing 52, which is formed as a partition surrounding the inlet valves 63 but excluding the exhaust valves 45. One exhaust valve 45 and one inlet valve 53 are associated with each cylinder so as to allow the inlet of fuel and exhaust of burnt gases from each cylinder.

I provide means for operating the exhaust and inlet valves, which means are shown the most clearly in Figs. 8 and 9. Referring thereto, it may be seen that associated with a cylinder head 24a there is an exhaust valve 45a and an inlet valve 53a. The valve 45a has a valve stem 54, which is urged by a spring 55 to seat the valve 45a. The valve 53a has a valve stem 56, urged by a spring 57 to seat the valve 53a. The stem 54 acting through a conventional tappet 54a bears upon the inner race 58 of the valve cam 59, shown most clearly in Fig. 9, and the valve stem 56 acting through a tappet 56a bears on the outer race 60 of the cam 59. Similarly, all of the exhaust valves have stems bearing through tappets on the inner race, and all of the inlet valves have stems bearing through tappets on the outer race, and the cam thus operates both the exhaust and the inlet valves.

The axes of the intake valves, such as 53a, lie in the surface of a frustrum of a cone, and the end of the co-operating valve tappets are shaped to conform to the cam surface 58 of the cam 59. The exhaust valves corresponding to valve 45a and their valve stems and tappets are located so that their axes lie in the surface of a frustrum of a cone with the ends of the co-operating valve tappets shaped to cooperate with the cam surface 60 of the cam 59. As shown in Fig. 9, the annular inclined cam surface 58 for the intake valves is combined with the concentric, annular, inclined cam surface 60 for the exhaust valves in a single unitary structure. It is therefore noted that the valves proper, both intake and exhaust, are located in spaced relation equi-distant from the axis of the main shaft 10; while the valve stem ends of and the tappets for the intake valves are located in spaced relation at a lesser distance from the main shaft than are those of the exhaust valves, thus the two sets of valves may ride their respective cam surfaces 58 and 60 concentric on the single cam block 59.

Referring again to Fig. 1, it may be seen that the exhaust manifolds, such as 27, are tapered to permit the continuous flow of exhaust gases into the exhaust pipe 62 (Fig. 3). The exhaust conduits 26 may be secured to the cylinder head 24 by means of bolts or studs.

In the operation of the valves, the cylinders fire in regular order in the direction of rotation. The intake valves open in the same order, and gases passing into the intake manifold 50, past the intake valves, are caused to whirl in a rotary swirling action in the short annular manifold, and thus the heavier vapor particles are prevented from settling, because they are thrown outward centrifugally into the valve pockets 63 (Fig. 4).

I also provide means for cooling the engine and such means forms the subject matter of my copending application for Letters Patent of the United States for improvements in Internal combustion engine, filed May 6, 1940, and serially numbered 333,517, the same being a division of this application. Referring especially to Fig. 4, there is shown a water inlet 64, through which water may be introduced into the compartment 65 formed between the partition 52 and the outer casing 66 of the cylinder head 24. The water thus enters the cylinder head and forms a mass around and between the exhaust valves and travels toward the center of the engine, passing through ports, such as the port 67. One of the ports 67 is shown more clearly in Fig. 5, wherein it may be seen that the port 67 connects the space 65 with a water-jacket 68 surrounding the cylinder 28. From the jacket 68 (Figs. 1 and 7), the water passes through an outlet 69 into a water conduit 70, leading back to the radiator 72. From the radiator 72, the water is pumped by the pump 73 through the water supply conduit 74 back to the water inlet 64.

In the passages 67 I insert metering ports 75, which permit the proper amount of water to flow around the exhaust valves and into the water-jackets for the cylinders. By this arrangement, I maintain the compartment 65 continuously filled with water and prevent the possibility of steam collecting in the exhaust cooling compartment. By reason of the fact that the ports 67 are located in the pockets for the exhaust valves, I eliminate the possibility of excessive hot water collecting in these pockets, thus giving more desirable and efficient cooling of the engine. It is also understood that the ports 75 may be varied in size so that a uniform temperature may be maintained throughout by increasing or decreasing the flow of the cooling medium. The fact also that the water heated by the exhaust surrounds the intake manifold 50 insures the maintenance of the fuel at a proper temperature. A steam relief port 67a, smaller than the metering ports 75, connects the compartment 65 in the head with the water-jacket 68 at their uppermost portions to permit steam forming in the head a ready escape to the outlet 69.

I provide means also for insuring the proper lubrication of all the moving parts of the engine. The inventive features of the lubricating system form the subject matter of my copending application for Letters Patent of the United States for improvements in Internal combustion engine, filed May 6, 1940, and serially numbered 333,518, the same being a division of this application. Referring to Figs. 10, 11, 12 and 13, and especially to Fig. 11, it may be seen that there is provided an oil reservoir 76, from which oil may flow by a conduit 77 to a central chamber 78 formed in the engine block adjacent to the drive shaft 10. As may be seen more clearly in Fig. 10, the drive shaft 10, adjacent to the outlet from the conduit 77, is provided with a series of spiral baffles 79 and 80. As may be seen, with the drive shaft 10 rotating in a clockwise direction (as viewed from the left in Fig. 10), the spiral baffles will force the lubricant in opposite directions from the conduit 77, forcing it to the journals 15 and 82, and in the opposite direction to the thrust bearings 12. The thrust bearings 12 are shown on an enlarged scale in Fig. 12 and are each provided with a plurality of spiral grooves, such as 84, whereby the oil is thrown onto the enlarged portion 11 of the drive shaft 10 and outwardly therefrom to lubricate the cam followers 36, the roller bearings therefor, the cam 13 and the pistons, during their movement in the cylinders. The oil collects in the lower part of the crank case, as at 85 (Figs. 10 and 11), and is forced therefrom by pressure in the crank case developed from the blow-by past the pistons. The oil is forced, through a Venturi nozzle 86, into a return conduit 87, from which it flows back to the supply tank 76. In passing out of the Venturi nozzle 86 into the conduit 87, the flow of the oil creates a suction, which draws oil from the opposite ends of the engine. Thus oil forced towards the ends of the engine by the baffles 80 passes outwardly to lubricate the valve mechanism, and eventually collects in pockets, such as 88, whence it passes through conduits 89 to the outlet at the Venturi nozzle 86, and there by the suction is pulled into the conduit 87 and thence by pressure to the reservoir. The reservoir 76 is provided with a float valve 90, used to close the vent opening of the reservoir in inverted flying. It is to be understood that oil passed through the journal 15 (Fig. 10) is discharged against the cam 59 and thrown centrifugally against the ends of the valve stems 54 and 56.

The design of the double-ended pistons is shown most clearly in Figs. 14 to 19, inclusive. It forms part of the subject matter of my copending application for Letters Patent of the United States for improvements in Internal combustion engine, filed October 29, 1938, and serially numbered 237,625, the same being a continuation in part of the present application. Each unit comprises a pair of pistons 29 and 32 connected by a connecting portion 33. The connecting or center portion may be considered as a beam for transferring the load caused by the reciprocating compression and explosion forces to the skirts 92 of the piston heads. The beam, in addition to supporting the follower rolls 39 and their bearings 34, transfers the loads well up into the skirts of the pistons. There the beam is secured to a rib 93, arranged transversely of the body portion of the piston, and to a second rib 94, extending longitudinally of the piston but at right angles to the beam 33. This allows for expansion of the rigid rib, and connects the beam through the ribs 93 and 94 to the semi-flexible skirt portion 92 of the piston head.

As may be seen at 95 in Figs. 14, 15 and 19, the piston head is slotted to allow for flexing thereof. The beam is preferably reinforced, as at 96, to stiffen the structure to the wear pads 99 bearing on the side of the cam 13. The central portion of the beam 33 has a U-section, as at 98, an outboard bearing or wear pads 99 to prevent rotation of the pistons with respect to the cylinder bores.

It is believed that the operation of my engine will be apparent from the above description. Fuel injected into the cylinders through the intake manifold 50 from the carburetor 48, at times permitted by the opening of the valves 53 as controlled by the cam 59, is exploded by the spark plugs, which may be inserted as at 100 (Fig. 10). The movement of the pistons outward reacts through the central beam, through the cam followers 36, upon the cam 13, and thus rotates the shaft 10. At this point the exhaust valves 45 are opened by the cam 59, and the exhaust gases escape through the exhaust manifold 27. The cam 59 is driven by the shaft 10 and, as stated, operates the exhaust and intake valves. The engine is cooled by the cooling system, previously described, and is lubricated by the lubricating system, also previously described.

It is to be understood that the above-described embodiments of my invention are for the purpose of illustration only, and various changes may be made therein without departing from the spirit and scope of the invention.

What I claim is:

1. In an internal combustion engine having a rotatable shaft, a plurality of cylinders arranged with their axes parallel to said shaft and grouped around said shaft, pistons reciprocable in said cylinders, means interconnecting said pistons and said shaft for effecting rotation of said shaft upon reciprocation of said pistons in said cylinders, and cylinder heads for said cylinders forming combustion chambers therefor, the combination of a group of valves cooperating with said heads for controlling the flow of combustible mixture to said combustion chambers and arranged with their axes in conical formation about the axis of said shaft, a tappet aligned with each of said valves and engaging the stem end thereof, and a cam fixed for rotation with said shaft and having a cam face thereof disposed approximately normal to the axes of said tappets and operatively engaging the same.

2. In an internal combustion engine having a rotatable shaft, a plurality of cylinders arranged with their axes parallel to said shaft and grouped around said shaft, pistons reciprocable in said cylinders, means interconnecting said pistons and said shaft for effecting rotation of said shaft upon reciprocation of said pistons in said cylinders, and cylinder heads for said cylinders forming combustion chambers therefor, the combination of a group of valves cooperating with said heads for controlling the flow of combustible mixture to said combustion chambers and arranged with their axes in conical formation about the axis of said shaft, a second group of valves cooperating with said heads for controlling the exhaust of products of combustion from said heads and also arranged with their axes in conical formation about the axis of said shaft, the stem ends of the first mentioned group of valves being arranged in a circle of different diameter than the stem ends of said second group of valves, and means for operating all said valves in timed relation with respect to the rotation of said shaft.

3. In an internal combustion engine having a rotatable shaft, a plurality of cylinders arranged with their axes parallel to said shaft and grouped around said shaft, pistons reciprocable in said cylinders, means interconnecting said pistons and said shaft for effecting rotation of said shaft upon reciprocation of said pistons in said cylinders, and cylinder heads for said cylinders forming combustion chambers therefor, the combination of a group of valves cooperating with said heads for controlling the flow of combustible mixture to said combustion chambers and arranged with their axes in conical formation about the axis of said shaft, a second group of valves cooperating with said heads for controlling the exhaust of products of combustion from said heads and also arranged with their axes in conical formation about the axis of said shaft, the centers of the heads of both groups of valves being arranged approximately in the same circle about the axis of said shaft, the stem ends of the first mentioned group of valves being arranged in a circle of different diameter than the stem ends of said second group of valves, and means for operating all said valves in timed relation with respect to the rotation of said shaft.

4. In an internal combustion engine of the class having a rotatable shaft, a plurality of cylinders arranged with their axes parallel to said shaft and grouped around said shaft, pistons reciprocable in said cylinders, means interconnecting said pistons and said shaft for effecting rotation of said shaft upon reciprocation of said pistons in said cylinders, the combination with said cylinders of a unitary cylinder head for all of said cylinders comprising an integral member providing a combustion chamber for each of said cylinders, an annular intake manifold and intake passages connecting the same through intake ports with each of said combustion chambers and forming between said passages outwardly opening pockets, exhaust passages connected with said combustion chambers through exhaust ports and extending through said pockets in spaced relation to the side walls thereof, valve guide supports, tappet guides, and a water jacket surrounding said passages; valves received by said valve guides for controlling the flow of fluid through said ports, and tappets received in said tappet guides and engaging said valves.

5. In an internal combustion engine of the class having a rotatable shaft, a plurality of cylinders arranged with their axes parallel to said shaft and grouped around said shaft, pistons reciprocable in said cylinders, means interconnecting said pistons and said shaft for effecting rotation of said shaft upon reciprocation of said pistons in said cylinders, the combination with said cylinders of a unitary cylinder head for all of said cylinders comprising an integral member providing a combustion chamber for each of said cylinders, an annular intake manifold and intake passages connecting the same through intake ports with each of said combustion chambers, exhaust passages connected with said combustion chambers through exhaust ports, valve guide supports, tappet guides, and a water jacket surrounding said passages, said member also being formed to provide a liquid discharge opening from said jacket between each adjacent pair of said intake passages.

6. In an internal combustion engine of the class having a rotatable shaft, a plurality of cylinders arranged with their axes parallel to said shaft and grouped around said shaft, pistons reciprocable in said cylinders, means interconnecting said pistons and said shaft for effecting rotation of said shaft upon reciprocation of said pistons in said cylinders, the combination with said cylinders of a unitary cylinder head for all of said cylinders comprising an integral member providing a combustion chamber for each of said cylinders, an annular intake manifold and intake passages connecting the same through intake ports with each of said combustion chambers, exhaust passages connected with said combustion chambers through exhaust ports, valve guide supports, tappet guides, and a water jacket surrounding said passages, there being the same number of valve guide supports as tappet guides and each valve guide support being aligned with a tappet guide, the axial lines of said valve guide supports and tappet supports being arranged in two groups, each group arranged to lie in a conical surface.

7. In an internal combustion engine of the class having a rotatable shaft, a plurality of cylinders arranged with their axes parallel to said shaft and grouped around said shaft, pistons reciprocable in said cylinders, means interconnecting said pistons and said shaft for effecting rotation of said shaft upon reciprocation of said pistons in said cylinders, the combination of a unitary cylinder head for all of said cylinders comprising an integral member providing a combustion chamber for each of said cylinders, an annular intake manifold and intake passages connecting the same through intake ports with each of said combustion chambers and forming between said passages outwardly opening pockets, exhaust passages connected with said combustion chambers through exhaust ports and extending through said pockets in spaced relation to the side walls thereof, valve guide supports, tappet guides, and a water jacket surrounding said passages, there being the same number of valve guide supports as tappet guides and each valve guide support being aligned with a tappet guide, the axial lines of said valve guide supports and tappet supports being arranged in two groups, each group arranged to lie in a conical surface, and the conical surface in which the axial lines of one group lie being of a different angularity than the conical surface in which the axial lines of the other group lie.

KARL L. HERRMANN.